Feb. 24, 1970 B. S. TODD 3,497,623

SECURE PERSONAL CONVERSATION USING TIME BLANKED NOISE GENERATOR

Filed Aug. 7, 1968

BARRY S. TODD
*INVENTOR.*

United States Patent Office 3,497,623
Patented Feb. 24, 1970

3,497,623

SECURE PERSONAL CONVERSATION USING TIME BLANKED NOISE GENERATOR

Barry S. Todd, Corona, Calif.
(1820 Temescal Ave., Narco, Calif. 91760)

Filed Aug. 7, 1968, Ser. No. 750,837
Int. Cl. H04m *1/70*
U.S. Cl. 179—1.5 2 Claims

ABSTRACT OF THE DISCLOSURE

A device, to be used in conjunction with at least one other similar device, comprising a telephone hand set or head set which is used or worn by each member of a conference. The hand set or head set comprises an audible noise generator positioned in above proximity to the user's mouth. The generator operates when the user is speaking and for some interval after he stops. A gate generator activates a chopper to permit voice signals to be transmitted to the earphone of another like device. During the transmission of a voice signal, an inverter deactivates another chopper to prevent noise from emanating from a noise output speaker. When a voice signal is not being transmitted, the chopper is deactivated and the inverter is activated to operate said other chopper and permit the generated noise to be heard through the noise output speaker. The gate generator is operated at a repetition rate which exceeds the Nyquist frequency necessary for a complete reconstructed speech signal to be transmitted to other listening stations.

Figure 1:
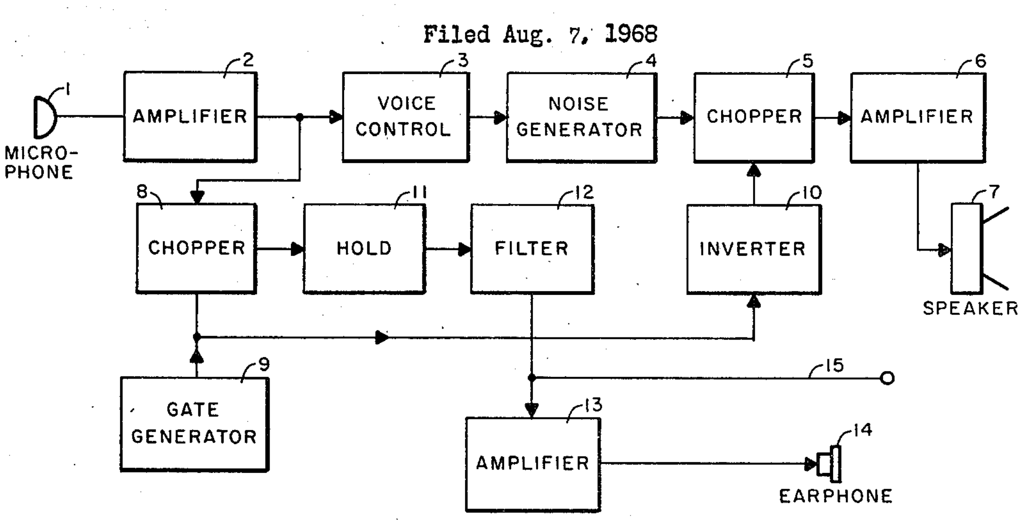

The invention herein described may be manufactured and used by or for the Government of the United States of America for governmental purposes without the payment of any royalties thereon or therefor.

The present invention relates to a communication securing device and more particularly to a telephone device for securing communication between two or more people, which comprises a time blanked noise generator.

Prior art devices use noise to mask conversations. Thus, persons engaged in the conversational exchange are required to sit in close proximity of each other or in specially constructed booths. Said closeness requirement can be eliminated by employing a portable telephone system which can be maintained secure by periodic inspection and personal custody. However, with such a system, noise sources must be installed so as to cover all areas likely to be used.

The present invention eliminates these requirements and allows any number of participants to engage in a secured conversation by providing a lightweight, completely portable device, each unit of which generates its own noise.

It provides a direct path for communication over an electrical network connecting a microphone to an earphone. No encoding or decoding are required. The device is simple and inexpensive to build, and existing hand set and head set units could be modified to include this unit. It can be used in any situation where it is desired that a conversation not be monitored by persons not included in the conversation. Personal custody and periodic inspection make each device secure.

An object of this invention is to provide a device which permits two or more persons to communicate without the possibility of being overheard by eavesdroppers or concealed recording devices.

Another object of this invention is to provide a secured communication device employing time blanked noise generation.

A still further object is to provide a secured communication system in which each device is lightweight, portable and equipped with its own noise generator so as not to be limited to use in a confined area or specially constructed booths.

These objectives are achieved by a device comprising a telephone hand set or head set which is used or worn by each member of a conference. The hand set or head set comprises an audible noise generator positioned in close proximity to the user's mouth. The generator operates when the user is speaking and for some interval after he stops. In operation, a gate generator activates a chopper to permit voice signals to be transmitted to the earphone of another like device. During the transmission of a voice signal, an inverter deactivates another chopper to prevent noise from emanating from a noise output speaker. When a voice signal is not being transmitted, the chopper is deactivated and the inverter is activated to operate said other chopper and permit the generated noise to be heard through the noise output speaker. The gate generator is operated at a repetition rate which exceeds the Nyquist frequency necessary for a complete reconstructed speech signal to be transmitted to other listening stations.

Figure 2:
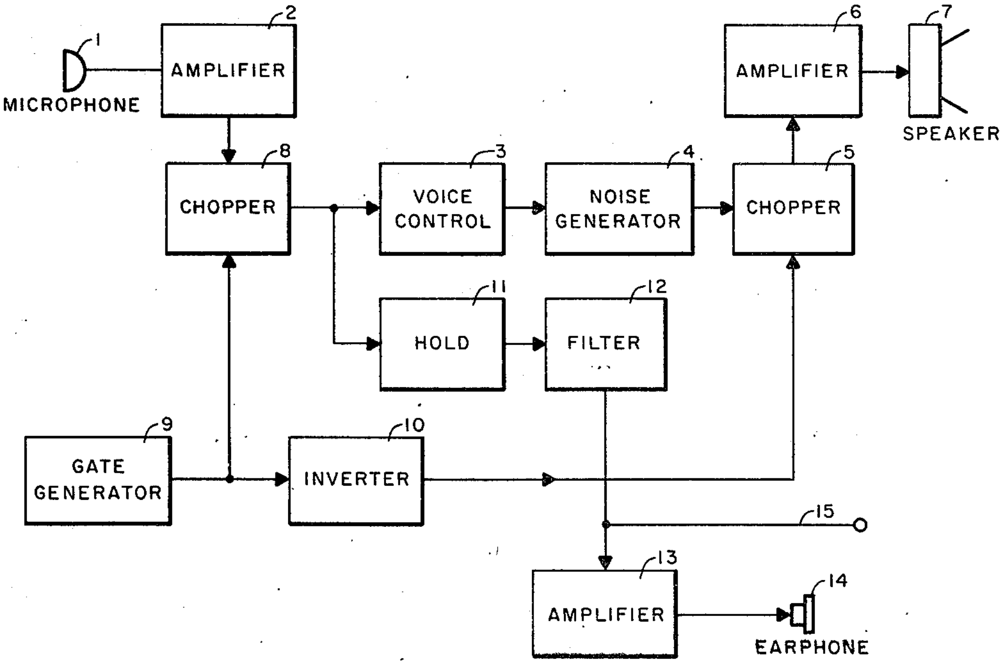

Other objects and many of the attendant advantages of this invention will become readily appreciated as the same becomes better understood by reference to the following detailed description when considered in connection with the accompanying drawings wherein:

FIG. 1 is a block diagram showing the general concept of one embodiment of the present invention; and FIG. 2 is a block diagram showing an alternate embodiment of the present invention.

Referring to FIG. 1, a noise output speaker 7 is added to the front of a microphone means 1 such as the microphone of a standard hand set and oriented so that it projects in alignment with a user's voice. When the user is speaking a noise generating means 4, comprising a combination of square wave generators capable of producing a spectrum of noise covering the audio range, is activated by a voice control gating means 3, for supplying an on/off signal to the noise generator, comprising an amplifier, followed by a rectifier, filter, and D.C. amplifier. Said noise which is amplified by an amplifier 6 and emitted by a noise output speaker 7 is periodically gated off by a chopper 5. Cessation of speaking causes the noise generator 4 to stop after a short time interval.

Audio from the microphone means 1 is amplified by an amplifier 2 and then gated by a chopper 8. The gated audio is stretched in a hold means 11, such as a boxcar circuit, passed through a filter means 12, and passed to an output line 15, used to interconnect the device with other units. A gate generator 9 consisting of a free running multivibrator generates the gating signal which is just wide enough for an efficient sampling of the audio. The audio is gated on during the gating period and the noise is gated off during this same interval. An inverter means 10 provides the inversion necessary for this operation.

Audio received over the output line 15 is amplified by an amplifier 13 and fed to an audio receiving means such as an earphone 14.

A person using a similar device hears a reconstructed version of the speaker's voice in his earphone 14. The reconstruction is complete enough that no difference is noticeable from the actual voice pattern. A complete and identical reconstruction requires only a sufficiently high sampling rate.

A person not using a similar device hears only the noise emanating from the noise generator 4. The off time of the noise is short and frequent enough to be unnoticeable.

The band width of the noise output speaker 7 and of the amplifier 6 must be large enough to pass the pulsed-off noise. Also, the microphone 1 and amplifier 2 must be capable of passing the same signal.

To prevent unwanted listeners from using the pulsed-off noise generator repetition rate for extracting the audio, the free running gate generator 9 can be controlled in frequency and phase by either a random noise generator or by characteristics of the user's voice, itself.

A noise cancelling microphone could be used to prevent the noise generated by the device from holding the voice control on. Referring the FIG. 2, an alternate arrangement to eliminate the same problem is shown. Under the arrangement, noise entering the microphone 1 cannot reach the voice controlled gate 3 because the noise generator 4 is off when chopper gate 8 is on.

Obviously many modifications and variations of the present invention are possible in the light of the above teachings. It is therefore to be understood that within the scope of the appended claims the invention may be practiced otherwise than as specifically described.

What is claimed is:

1. A device to be used in conjunction with at least one other similar device for securing personal conversations comprising:

(a) means for generating a noise signal;

(b) microphone means for receiving an audio signal and converting said audio signal to an electrical signal, normally gated off to prevent noise generated by said noise generator from being picked up by said microphone means;

(c) a gate generator which gates a signal just often enough for an efficient Nyquist sampling of the audio signal of the conversation to be secured;

(d) voice control gating means in circuit with the noise generator and coupled to said microphone means for activating said noise generator in response to the presence of an audio signal;

(e) a noise output speaker;

(f) a chopper in circuit with the means for generating a noise signal and coupled to said noise output speaker;

(g) another chopper in circuit with said gate generato and coupled to said microphone means;

(h) inverter means in circuit with said gate generator and said chopper for effecting an inversion between the action of said chopper and said other chopper;

(i) hold means in circuit with said other chopper for stretching the sampled signal;

(j) filter means in circuit with said hold means, for eliminating unwanted frequencies introduced by the sampling process;

(k) an output line connected to said filter means whereby the filtered audio is conveyed to other similar devices; and (l) audio receiving means coupled to said output line for converting an electrical signal into sound waves.

2. A device to be used in conjunction with other similar devices for receiving personal conversations as claimed in claim 1 in which the voice control gating means is in circuit with the noise generator and said other chopper.

References Cited

UNITED STATES PATENTS 3,213,199 5/1969 Snow ---------------- 179—1.5

RICHARD A. FARLEY, Primary Examiner

CHARLES E. WANDS, Assistant Examiner